3,003,494
ADJUSTABLE OUTDOOR COOKING GRILL
Irene F. Ross and Gordon A. Lamb, both of 27 Lockheed Blvd., Toronto, Ontario, Canada
Filed Mar. 29, 1957, Ser. No. 649,537
4 Claims. (Cl. 126—9)

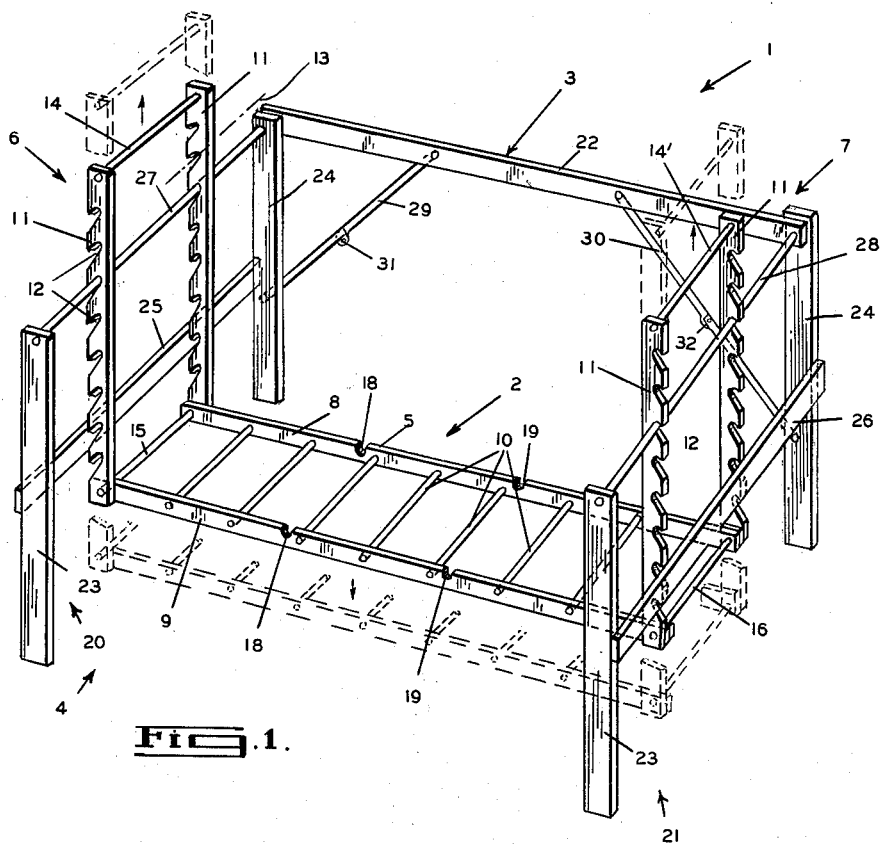
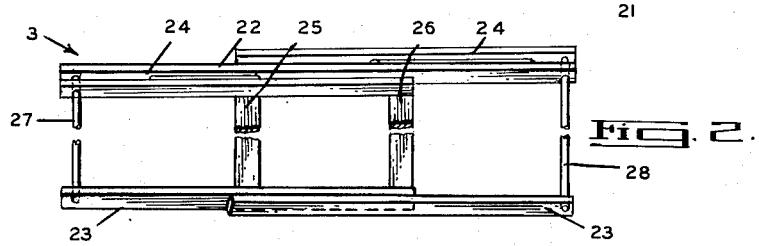
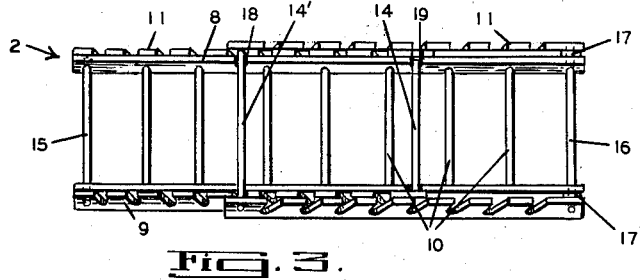

This invention relates to an outdoor cooking grill structure which is especially adapted for use over an open fire.

The principal object of this invention is to provide a light-weight outdoor grill structure which can be erected and dismantled very quickly and easily and which, in its dismantled state, has a compactness for storage or for transportation.

Another principal object of this invention to to provide an outdoor grill structure which can be adjusted to regulate the amount of heat used for the cooking of the food and further, to correct for any unevenness or slope in the ground.

Further, it is another important object to provide a grill structure as aforesaid which is extremely stable in its erected state and can be used with the least risk of harm over an open fire.

It is another object of this invention to provide an outdoor grill as aforesaid which is very simply constructed, thereby greatly reducing the cost of manufacture, and further, to provide an extremely sturdy and durable outdoor grill structure which has a very pleasing appearance.

A principal feature of this invention resides in providing an outdoor grill structure of two separate interlocking components, one component comprising a grill member having arm members hinged thereto at opposite ends and being foldable into substantially the plane of the grill member and the other component comprising a support frame in which said grill is adapted to be suspended from the arm members, said support frame including a pair of leg frames each being foldable into a common plane, each component comprising a compact unit which can be conveniently transported.

Another principal feature of this invention resides in providing an outdoor grill structure as aforesaid in which each of the arm members of the grill member are formed with a series of aligned notches and the support frame includes spaced bars to be received in the notches whereby positions of the grill suspended in the frame may be chosen with reference to the intensity of the flame of the open fire and to the unevenness or slope of the ground.

It is still another feature of this invention to form the arm members from spaced bars which provides lightness as well as stability, the bars being secured at one end to the grill on a common pivot axis or hinge secured at the other end to a rod extending between the bars, the rod serving as a handle for adjusting the grill with respect to the frame and ground as well as for removing the grill member from the frame.

Another feature of this invention resides in constructing the support frame of a substantially greater width than the width of the grill member and arm members so that the bars to be received in the notches of the arm members permit horizontal displacement in relation to the fire and further, to have one side of the frame open so that the grill member and arms may be removed with a minimum risk of harm.

These and other objects and features are described in the following specification to be read in conjunction with the sheet of drawings in which:

FIGURE 1 is a perspective view of the outdoor grill structure in its erected state;

FIGURE 2 is a perspective view of the support frame component in its folded or dismantled state; and FIGURE 3 is a perspective view of the grill component in its folded or dismantled state.

With reference to FIG. 1 of the drawings the outdoor grill structure generally designated at 1 includes a grill unit 2 suspended within a support frame unit 3 having an open side generally designated at 4.

The grill unit 2 comprises a grill frame or member 5 provided with pivotal support arm formations 6 and 7 hinged to the opposite ends thereof. The grill member 5 itself comprises a pair of spaced bars 8 and 9 which have secured therebetween a plurality of rods 10 for supporting cooking utensils and the like.

The support arm formations 6 and 7 each are constructed from a pair of substantially identical rack-like bars 11, the rack-like appearance being exhibited by a plurality of aligned notch formations 12 which extend throughout substantially the entire length of the bars 11. The notches 12 are so formed in the bars that the longitudinal axis 13 of the notch 12 defines an angle with the main axis of the bar 11 with the opening of the notch projecting downwardly.

Each support arm formation 6 and 7 is provided with a handle member or rod 14 and 14', respectively, which is secured to the spaced bars 11 at their free or unattached ends. The arm formations 6 and 7 are secured to the grill frame 5 by means of rods 15 and 16, respectively, the rods 15 and 16 extending through apertures in the bars 8 and 9 and through apertures located in the bars 11 comprising the arm formations.

It will be seen from FIGURE 3 that the grill unit 2 is foldable into a substantially planar disposition. In order that this may be accomplished the support arm formation 7 has been constructed to provide a larger width dimension than the support arm formation 6 which is accomplished by increasing the length of the pivot rod 16 and handle bar or rod 14' so that the arm formation 7 on being folded lies over and without the arm formation 6. Spacer means 17 prevent the displacement of the rod 16 relative to the grill frame 5 maintaining the arm formation 7 at all times in its proper disposition with respect to the arm formation 6.

As best seen in FIGURE 1 the bars 8 and 9 of the grill frame 5 are formed with spaced notches 18 and 19, respectively, and are adapted to receive the bars 14 and 14' on folding of the arm formations 6 and 7 into the planar disposition for storage or transportation.

With reference to FIGURES 1 and 2 of the drawings, the support frame generally designated at 3 comprises essentially a pair of leg frames 20 and 21 which are pivotally secured to a brace bar 22 which extends along one side. The leg frames 20 and 21 each comprise a pair of leg members 23 and 24 which are rigidly secured to the bars 25 and 26, respectively, intermediately of their height. Each leg frame is provded with a rail member or rod 27 and 28, respectively, which is rigidly secured to each of the legs 23 and 24 and passes through an aperture formed in the brace bar 22 and secured in a manner enabling each of the leg frames 20 and 21 to pivot relative to the frame 22.

More particularly, as best seen in FIGURE 2, the leg frame 21 has a greater width than the leg frame 20, the leg member 24 of the leg frame 21 being positioned on the opposite side of the brace bar 22, so that when folded the support frame can assume a substantially planar configuration. As best seen in FIGURE 2, the leg frame 21 lies without the leg frame 20 in its folded state.

The leg members 24 are further attached to the brace bar 22 by means of self-locking brackets 29 and 30 which serve to brace and render stable the support frame in its erected state. The brackets 29 and 30 are foldable about central pivots 31 and 32, respectively, when the frame is dismantled.

From the foregoing description, it is seen that the structure of the outdoor cooking grill is of an extremely simple nature and can be erected and dismantled very easily and quickly, the parts being foldable into a flattened or planar disposition for storage or convenient transportation.

From the dotted showing in FIGURE 1 it will be appreciated that by grasping of the rods 14 and 14' of the arm formations the grill structure 2 may be raised or lowered to place the grill frame 5 in a desired position above the ground and in the proper place to cook food. Also, because of the construction of the grill unit one end may be lowered and the other end may be raised to accommodate any unevenness or slope in the ground and thereby present a substantially horizontal grill to support utensils. It will also be appreciated that the legs of the support frame 3 can be elevated above the ground or driven into the ground to additionally level the grill.

The leg frames 20 and 21 have a substantially greater width dimension as compared with the width of the grill unit 2 in order that the grill unit can be shifted transversely towards or away from the flame of the fire.

It is also a feature that by constructing the support unit 3 so that it has a greater width the folded grill structure 2 can be placed within the folded support frame 3 to form a compact unit for transportation or storage.

Further, by having the support frame open at one side utensils may be withdrawn and placed on the grill from the side without exposing the hands to the danger of being burned by the flames. Also because of the disposition of the grill in its suspended state within the frame there is effected a very stable cooking structure which can support a greater number of dishes or cooking utensils.

It will be appreciated that while the preferred embodiment of the invention has been illustrated and described various other modifications may be constructed within the scope and spirit of the appended claims.

What we claim as our invention is:

1. In a collapsible grill structure, an open-sided surface-engaging frame including substantially vertically extending side frames, each presenting a substantially horizontal support rail member vertically spaced from the surface-engaging extremities thereof with each support rail member arranged in substantially parallel relation to the other, and a generally horizontally disposed grill formation removably suspended within said open-sided frame, said grill formation having a pair of substantially vertically extending arm formations hinged thereto, one at each end, each of said arm formations presenting a series of vertically spaced horizontally aligned pairs of hook formations of a size and configuration arranged to snugly engage over its respective rail member for selectively suspending said grill formation therefrom over a range of vertical adjustment.

2. In a collapsible grill structure according to claim 1 wherein each of said arm formations comprises a pair of elongated bars arranged in spaced parallel relation and pivotally secured at their lower ends to said grill formation, and a handle formation secured between each of said bars at their upper ends, with the vertically extending edges of said bars of each arm formation having said series of vertically spaced, horizontally aligned, downwardly opening notches of a size and configuration arranged to snugly engage over its respective rail member.

3. In a collapsible grill structure according to claim 2 wherein said grill formation comprises elongated parallel bar members connected by a plurality of spaced rods extending therebetween at substantially right angles thereto, the bars of one of said arm formations having a separation therebetween greater than the separation of said parallel bar members of said grill formation and pivotally secured to one end thereof to swing from a substantially vertically extending position thereabove into a substantially coplanar relation therewith, and the other of said arm formations having a separation therebetween greater than the separation of said bars of said first-mentioned arm formation and secured to the other end of said grill formation to swing from a substantially vertically extending position thereabove into substantially coplanar relation therewith, the parallel bar members of said grill formation each being provided with notch formations to register with the handle formation of each of said arm formations, one pair of notches of said first-mentioned arm formation being arranged to register with the handle formation of said second-mentioned arm formation.

4. In a collapsible grill structure according to claim 3 wherein spacing means are provided between the pivoted ends of the bars of said second-mentioned arm formation and said grill formation whereby said latter arm formation is maintained in alignment relative to said grill formation and to said first-mentioned arm formation.

References Cited in the file of this patent

UNITED STATES PATENTS

| | | |
|---|---|---|
| 42,879 | Savier | May 24, 1864 |
| 744,083 | Low | Nov. 17, 1903 |
| 746,539 | Low | Dec. 8, 1903 |
| 829,642 | Flandreau | Aug. 26, 1906 |
| 1,266,244 | Fortmann | May 14, 1918 |
| 1,271,326 | Kivlan | July 2, 1918 |
| 1,552,479 | Goldberg | Sept. 8, 1925 |
| 2,511,594 | Loffredo | June 13, 1950 |
| 2,515,521 | Loffredo | July 18, 1950 |
| 2,679,243 | Lee | May 25, 1954 |
| 2,708,925 | Cordrey | May 24, 1955 |
| 2,780,215 | Vacanti | Feb. 5, 1957 |
| 2,821,187 | Tescula | Jan. 28, 1958 |
| 2,856,502 | Wolf | Oct. 14, 1958 |

FOREIGN PATENTS

| | | |
|---|---|---|
| 14,030 | Great Britain | 1895 |